United States Patent Office 3,245,960
Patented Apr. 12, 1966

3,245,960
POLYURETHANE COATINGS FOR ELECTRICAL
CONDUCTORS AND THE LIKE
Ralph J. Curtis, Berkley, Mich., assignor to General Motors Corporation, Detroit, Mich., a corporation of Delaware
No Drawing. Filed Nov. 13, 1961, Ser. No. 152,024
5 Claims. (Cl. 260—77.5)

This invention relates to improved polymeric coatings for electrical conductors such as magnet wires and the like and to a method for the application of the coatings.

Insofar as it is known in the prior art, polyurethane-type electrical wire coatings or enamels as they are often called are applied to the wire from coating baths including polyesters having a relatively high molecular weight in the vicinity of 2000 to 4000 and having a large number of hydroxyl groups so that upon reaction with an organic polyisocyanate compound a highly cross-linked film or coating is formed containing both ester and urethane linkages. The polyester ingredient is a relatively viscous material which will react with anorganic polyisocyanate when suitably admixed with catalysts. The preparation of these prior art coatings involves considerable cost in terms of processing equipment, labor and materials.

It is an object of this invention to provide a urethane type electrical wire coating which is more economical than those of the prior art and has improved physical properties. It is a further object of this invention to provide an improved electrical wire coating having urethane linkages only which is the reaction product of a diol, a triol and an organic polyisocyanate. An important object of the invention is a coating composition for applying the coatings to the surface of electrical conductors and the like consisting of a solvent solution of monomeric precursor compounds including a blocked organic polyisocyanate and preferably a diol and a triol.

In general these and other objects are accomplished by first preparing a non-resinous low molecular weight film-forming mixture consisting of a diol which preferably contains an aromatic structure and has its hydroxyl groups attached to an aliphatic chain no greater than two carbon atoms in length, such as bis-(2-hydroxyethyl) ether of hydroquinone; a triol having no hydrogen atoms on the carbon atom attached to the carbonol group such as trimethylolpropane; and a blocked organic diisocyanate such as blocked diphenylmethane 4,4'-diisocyanate in a solvent solution. In the coating process the wire to be coated is dipped in the solution and then transferred to a curing oven. Further objects and advantages of the invention will become apparent from the following detailed description wherein preferred embodiments of the invention are given by way of illustration.

The coating composition of this invention involves a simple mixture of non-polymeric substances which are readily applied to a wire from a solvent solution by standard and well known procedures and which on curing produces coatings having superior properties for electrical conductors such as heat shock, flexibility, thermoplastic flow, resistance to solvent action, heat aging, heat stability, solvent extraction and dielectric properties. In general, a coating bath in accordance with this invention consists of monomeric low molecular weight components and includes as essential constituents an organic diisocyanate compound, preferably an aromatic type such as diphenylmethane 4,4'-diisocyanate; a diol containing an aromatic structure in which the hydroxyl groups are attached to aliphatic chains having no more than two carbons in length such as the bis-(2-hydroxyethyl) ether of hydroquinone; and a triol such as trimethylolpropane containing no hydrogen atoms on the carbon atom attached to the methylol (—COH) group.

A specific illustration of a bath composition in accordance with the invention is the following Example I:

Example 1

| Component | Equiv. Weight | Equivalents Used |
|---|---|---|
| Diphenylmethane 4,4' diisocyanate | 125 | 2.0 of isocyanate. |
| Trimtheylolpropane (triol) | 44.7 | 1.0 of hydroxyl. |
| Bis-(2-hydroxyethyl) ether of hydroquinone | 99.1 | Do. |

The diphenylmethane 4,4'-diisocyanate is first capped or reacted with a phenol which renders it nonreactive at room temperature. Upon being heated to a temperature in the neighborhod of 150° C. the phenol splits off to produce the diphenylmethane 4,4'-diisocyanate compound having free isocyanate groups. The isocyanate groups are then available for preferential reaction with the aliphatic hydroxyl groups of the triol and diol.

The coating solution is prepared by first dissolving the phenol-capped diphenylmethane 4,4'-diisocyanate in a cresol or a mixture of cresols to form a component A. The hydroxyl compounds are likewise dissolved in a cresol solvent to form a solution B. The diisocyanate-cresol mixture is then heated at the boiling point thereof for about 5 minutes to assure permanent solution. The diol-triol-cresol mixture is heated only sufficiently to effect solution of the ingredients. Upon being cooled to room temperature the two solutions are combined.

Coating of a wire is effected by dipping the wire into the coating solution to form adherence of thin film of the liquid thereon. Thereafter the dipped wire is passed through a vertical furnace heated to a temperature of about 550° F. at the base thereof to about 650° F. at the top. The wire is passed at the rate of about 35 feet per minute through a 20 foot oven to effect a satisfactory cure of the coating. Satisfactory coatings may be obtained from coating compositions in which the triol component is present in the range of from about 0.75 to 1.25 hydroxyl equivalents and conversely in which the diol varies from about 1.25 to 0.75 hydroxyl equivalents.

Various pertinent properties for electrical conductor coating purposes have been determined and are tabulated below for the coating described in connection with Example I. These are compared with typical properties for polyester-polyurethane type electrical conductor coatings presently known in the prior art and available commercially.

| Property | Polyester-Urethane Typical Properties | Coating of Example I |
|---|---|---|
| Thermoplastic Flow Temperature, °F | 520 | 620 |
| Abrasion Resistance (Repeated scrape) Strokes | 100 | 180 |
| Heat Shock (1.0 hour 3X), °F | 300 | 350 |
| Toluene-Methanol Extractible, percent | 1.3 | 0.3 |
| Solvent Resistance | Good | Excellent |
| Heat Aging (168 hours at 284° F) | Pass | Pass |
| Wet Dielectric Strength | Good | Good |
| Freon Resistance | Poor | Good |

The thermoplastic flow test involved placing a coated wire and an uncoated wire in abutting and transverse relation to one another, applying a 14 pound weight thereto and connecting a six volt signal circuit across the wires. The wires were heated to produce a rise in the temperature of the wire of 3° F. per minute. The temperatures listed in the above tests are the temperatures at which a break down in the insulation is evident in the signal circuit. The remaining tests are the standard tests of the National Electrical Manufacturers Association. The abrasion resistance test was performed using a General Electric repeated scrape abrasion tester. The data is an average of three specimens in each test represented.

It will be noted that the coating of this invention is markedly superior to the typical commercial product in plastic flow, abrasion resistance, heat shock resistance, toluene-methanol extraction and solvent resistance properties. In addition the coating of the Example I has heat aging and wet dielectric properties which compare favorably with the coatings of the prior art.

Another illustration of an excellent coating composition in accordance with this invention is the following Example II:

*Example II*

| Component | Equiv. Weight | Equivalents Used |
|---|---|---|
| Diphenylmethane 4,4' diisocyanate | 125.0 | 2.0 of isocyanate. |
| Trimethylolpropane (triol) | 44.7 | 1.0 of hydroxyl. |
| Bis-(2-hydroxyethyl) ester of terephthalic acid (diol). | 127.1 | Do. |

Satisfactory coatings may be obtained in compositions in which the triol is varied from about 0.75 to 1.25 hydroxyl equivalents and the diol is varied from 1.25 to 0.75 hydroxyl equivalents. In coatings of this type the total equivalents of hydroxyl groups in the diol and triol components must equal two in order to maintain the stoichiometric relationship with the organic polyisocyanate. Another illustration of a suitable formulation in accordance with the invention is the following Example III:

*Example III*

| Component | Equiv. Weight | Equivalents Used |
|---|---|---|
| Diphenylmethane 4,4' diisocyanate | 125 | 2.0 of isocyanate. |
| Trimethylolpropane (triol) | 44.7 | 1.0 of hydroxyl. |
| Bis-(2-hydroxyethyl) ether of 2,2 (p-hydroxyphenyl) propane (diol). | 158 | Do. |

Other satisfactory three component systems as above described were made using neopentyl glycol and the bis-(2-hydroxypropyl) ether of 2,2 (p-hydroxyphenyl) propane as diols in the formulation shown above. Other compounds which may be used as the diisocyanate component to form similar three component systems include 3,3' dimethyl diphenylmethane 4,4' diisocyanate, 3,3' bitolylene 4,4' diisocyanate and dianisadine 4,4' diisocyanate. Other compounds such as trimethylolethane, glycerol and pentaerythritol may be used as the triol ingredient. Other diols which may be used include 1,4 (hydroxymethyl) benzene, 2,5 (hydroxymethyl) p-xylene, 1,4 dimethanol cyclohexane, bis-(2-hydroxyethyl)ester of terephthalic acid and bis-(2-hydroxyethyl)ester of isophthalic acid, Valuable coatings have also been obtained from monomeric coating compositions consisting essentially of a solvent solution of a blocked organic polyisocyanate and certain monomeric diols. Bis-(2-hydroxyethyl) ether of hydroquinone, bis-(2-hydroxyethyl) ether of 2,2-(p-hydroxyphenyl) propane and bis-(2-hydroxyethyl) ester of terephthalate were each mixed with stoichiometric proportions of blocked diphenylmethane 4,4' diisocyanate in cresol solvent solution, applied to a substrate and cured. Each of these compositions gave clear, transparent films having a good toughness, hardness, adhesion and flexibility.

While the embodiments of the present invention as disclosed herein constitute a preferred form, it is to be understood that other forms may be adopted without departing from the spirit of the invention.

I claim:

1. An electrical conductor wire coating bath comprising a monomeric mixture in the form of a solvent solution of two isocyanate equivalents of a blocked organic diisocyanate containing an aromatic group, and two hydroxyl equivalents consisting of 1.25 to 0.75 hydroxyl equivalents of a diol having an aromatic structure in which the hydroxyl groups are attached to aliphatic chains not more than 2 carbons in length and 0.75 to 1.25 hydroxy equivalents of trimethylolpropane.

2. An electrical conductor wire coating bath comprising a monomeric mixture in the form of a solvent solution of about two isocyanate equivalents of a blocked disphenylmethane 4,4' diisocyanate, and two hydroxyl equivalents consisting of 1.25 to 0.75 equivalents of bis-(2-hydroxyethyl) ether of hydroquinone and 0.75 to 1.25 equivalents of trimethylolpropane.

3. An electrical conductor wire provided with a coextensive coating comprising the reaction product of two isocyanate equivalents of an aromatic diisocyanate, and two hydroxyl equivalents consisting of 1.25 to 0.75 hydroxyl equivalents of a diol containing an aromatic structure in which the hydroxyl groups are attached to aliphatic chains not more than 2 carbons in length and 0.75 to 1.25 hydroxyl equivalents of trimethylolpropane.

4. An electrical conductor wire provided with a coextensive coating comprising the reaction product of two isocyanate equivalents of diphenylmethane 4,4' diisocyanate and two hydroxyl equivalents consisting of 1.25 to 0.75 equivalents of bis-(2-hydroxyethyl) ether of hydroquinone and 0.75 to 1.25 hydroxy equivalents of trimethylolpropane.

5. A method of coating an electrical conductor wire comprising the steps of mixing two isocyanate equivalents of a blocked aromatic diisocyanate with two hydroxy equivalents consisting of 1.25 to 0.75 hydroxy equivalents of a diol having an aromatic structure in which the hydroxyl groups are attached to aliphatic chains not more than two carbons in length and 0.75 to 1.25 hydroxyl equivalents of trimethylolproprane in solvent solution, applying the mixture to the wire in the form of a thin coating and heating the coating to a temperature and for a time sufficient to cure the coating.

References Cited by the Examiner

UNITED STATES PATENTS

| 2,910,381 | 10/1959 | Vogel | 260—77.5 |
| 2,967,117 | 1/1961 | Arledter | 177—161 |
| 3,001,971 | 9/1961 | Scott | 260—75 |
| 3,012,993 | 12/1961 | Rogan | 260—77.5 |
| 3,021,307 | 2/1962 | Csendes | 260—77.5 |
| 3,078,257 | 2/1963 | Rinke et al. | 260—77.5 |
| 3,110,615 | 11/1963 | Keel | 117—161 |
| 3,135,708 | 6/1964 | Muller | 260—77.5 |

LEON J. BERCOVITZ, *Primary Examiner.*

H. N. BURSTEIN, *Examiner.*